March 17, 1959     E. G. HAWKE     2,878,032
THREE-WHEELED MOTORCYCLE WITH ROCKABLE REAR WHEEL ASSEMBLY
Filed Sept. 8, 1955
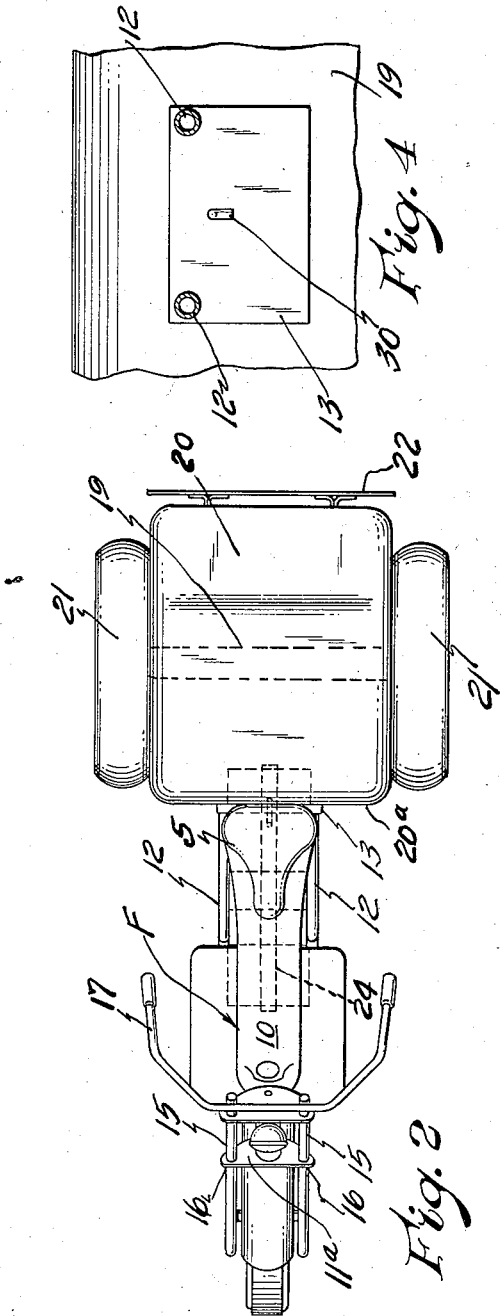
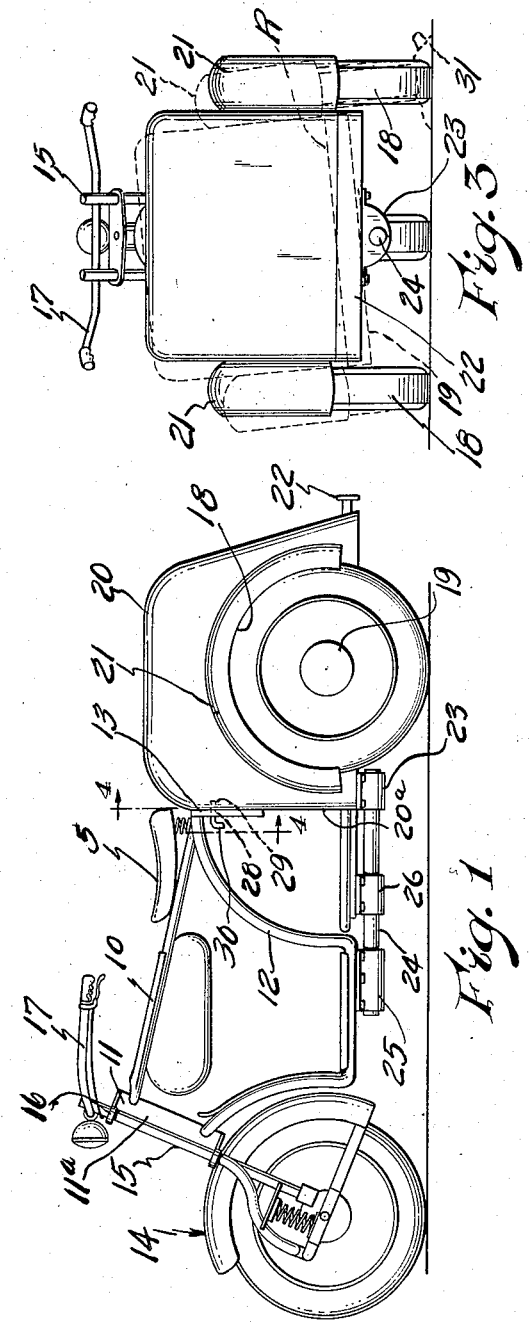
INVENTOR.
Earle G. Hawke.
BY
Fearman & Fearman.
ATTORNEYS

United States Patent Office 2,878,032
Patented Mar. 17, 1959

2,878,032

THREE-WHEELED MOTORCYCLE WITH ROCK-ABLE REAR WHEEL ASSEMBLY

Earle G. Hawke, Clarkston, Mich.

Application September 8, 1955, Serial No. 533,044

2 Claims. (Cl. 280—282)

This invention relates to improvements in motor driven vehicles of the motor cycle type and motor particularly to a new and improved three wheeled motorcycle or velocipede which is so designed that it has the easy maneuverability of a two wheeled velocipede on turns and corners.

While three wheeled vehicles which include a pair of abreast wheels connected to a single central front or rear wheel are extremely stable and have important safety advantages, it is well known that they are disadvantageous in other respects. When making turns or sharp curves, for example, conventional vehicles of this type behave like four wheeled vehicles in that the rider cannot lean into the turn to overcome centrifugal forces and the predisposition to tip as he can on a two wheeled tandem velocipede.

One of the prime objects of the instant invention is to design a motor driven tricycle-type vehicle in which the central front wheel is pivotally connected to the rear wheels so that the weight of the rider can be utilized to stabilize the vehicle when traveling around turns and sharp curves at relatively fast speeds in the same manner and as easily as if the vehicle were a conventional two wheeled motorcycle.

A further object of the invention is to provide a velocipede of the type described which permits the rider to lean into a turn or sharp curve so that his weight aids in properly steering the vehicle around the turn.

Another object of the invention is to design a tricycle-type vehicle as described in which the rear wheel assembly is permitted to pivot or tilt in a vertical plane relative to the front wheel assembly when one of the rear wheels hits an obstruction or the like and the possibility of the obstruction upsetting the vehicle or throwing it into a skid is accordingly eliminated.

A further object of the invention is to design a velocipede of the character described which "rides" over obstructions and rugged terrain as noted and in so doing provides a smoother ride which does not severely tax or overload the spring suspension system.

Another object of the invention is to design a tricycle-type velocipede in which the rear wheel assembly is pivoted to the front wheel assembly to permit relative tilting as described but can be very easily and rapidly locked in a given position to prevent tilting of one relative to the other when desired.

A still further object of the invention is to design a compact and light-weight vehicle of rugged and durable construction which can be very economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

In the drawing:

Fig. 1 is a side elevational view of the vehicle with the front and rear wheel assemblies locked in upright position.

Fig. 2 is a top plan view thereof.

Fig. 3 is a rear end elevational view, the broken lines illustrating the manner in which the rear wheel assembly can tilt relative to the front wheel assembly and "ride" over an obstruction when the latch which secures the assemblies in a fixed relative position is removed.

Fig. 4 is a fragmentary transverse view taken on the line 4—4 of Fig. 1.

Referring now more particularly to the accompanying drawing in which I have shown a preferred embodiment of the invention a letter F generally indicates the cycle frame which includes a top bar 10 rigidly connected to a steering post support member 11 and to the rear ends of lower U-shaped frame members 12 as shown. The front ends of the members 12 are in turn rigidly fixed to the lower end of the member 11 and the rear ends thereof are fixed to a bearing plate 13. It will be observed that the rider's seat or saddle S is resiliently supported on the top bar 10.

The front wheel assembly 14 includes front wheel support and steering posts 15 which are pivotally received in sockets 16 provided in laterally extending portions 11a of the support member 11 as shown, and a handlebar 17 is secured to the upper ends of the posts 15. Plainly, by turning the handlebar 17 the rider pivots the posts 15 in their sockets 16 and so turns the front wheel assembly 14 in the usual manner. Inasmuch as the instant invention does not concern the details of the front wheel assembly which are conventional the same will not be further described.

The rear wheels 18 which may be supported by a powered unitary axle 19 in the same manner as are the rear wheels of conventional automobiles will preferably have a suitable spring suspension system and may be driven through differential means of a common type. Since the wheels 18 are connected by a common axle housing a motor driven axle shaft, the wheels move as a unit (see their tilted position in Fig. 3). This rear wheel assembly R which also is conventional and accordingly need not be further described in detail is housed by a body 20 which includes fenders 21 and a rear bumper 22. It will be seen that the front wall 20a of the body has bearing engagement with the plate 13.

Depending from the underside of the body 20 is a bearing block or sleeve 23 which is adapted to pivotally receive a longitudinally disposed pivot shaft or rod 24. The latter rod 24 is supported by a similar block 25 which is fixed to the underside of the lower frame member 12. The shaft 24 is held rigidly by the block 25, however the sleeve or bearing 23 and a sleeve or bearing 26 which is mounted on a support member 27 extending forwardly from the body 20 are pivotal on the shaft 24 and permit the rear wheel assembly R to pivot as a unit relative to the front wheel assembly 14. The shaft 24 may be keyed to the bearings 23 and 26 in a manner to permit relative rotation of the shaft and bearings while restraining relative axial movement thereof or thrust bearings or the like fixed to the shaft could be provided at the ends of the sleeves 23 and 26 to restain relative axial movement. Obviously, also, roller bearings may be provided within the sleeves 23 and 26.

Provided in the plate 13 and front wall 20a of the body 20 are openings 28 and 29 which are in alignment when both the front and rear wheel assemblies are in vertical position. A removable latch 30 is snugly receivable in these openings to lock the assemblies 14 and R in this position.

When the latch 30 is disposed in the openings 28 and 29 as in Fig. 1, relative tilting between the two wheel assemblies will be disabled so that the vehicle will ride in the manner of an ordinary tricycle and the tricycle and the rider will not be able to lean into turns and curves as he can on a two wheeled cycle. When the latch 30 is pulled outwardly however and removed from the openings 28 and 29, the front wheel assembly 14 will be enabled or free to pivot relative to the rear wheel assembly R and similarly the rear wheel assembly R will be free to pivot relative to the front wheel assembly 14. As the vehicle is rounding a turn or banked curve and the rider leans or banks into the turn, the front wheel assembly 14 can tilt in either direction relative to the rear wheel assembly R, the shaft 24 twisting in the bearings 23 and 26. By leaning into the turn the weight of the rider will be utilized to stabilize the vehicle and overcome the centrifugal force which tends to tip the cycle outwardly.

Further, if one of the rear wheels 18 encounters an obstruction 31 in its path (Fig. 3), the rear wheel assembly R can tilt relative to the front wheel assembly 14 as shown in Fig. 3 and there is no danger that the sudden lifting of one wheel will upset the vehicle. In this case the bearings 23 and 26, of course, twist on the shaft 24. Inasmuch as the axis of pivot is below the axis of the wheels the vehicle will have an increased stability on turns and curves.

It should be apparent that I have perfected a three wheeled vehicle which has all the stability and safety characteristics of a tricycle while still having the maneuverability of a bicycle or conventional motor cycle on turns.

It is to be understood that I do not wish to limit the application of the novel principles involved in any way and accordingly the drawing and descriptive matter in all cases are to be interpreted as illustrative of the invention rather than as limiting the scope thereof. It is contemplated that various changes within the principle of the invention and scope of the appended claims may be made in the various elements which comprise the vehicle to achieve the same result.

I claim:

1. In a three wheeled vehicle, a front wheel assembly having a single ground engaging rotatable wheel, a frame unit including support means for a rider connected to said wheel assembly whereby the latter may turn in a lateral plane relative to the former, a transversely disposed rear bearing plate on said frame, a rear wheel assembly having a pair of spaced apart wheels in abreast arrangement, each of which is outward of said front wheel, a housing unit for said rear wheel assembly having a transverse wall in bearing engagement with said rear plate on the frame, a longitudinal shaft carried between said frame and housing below the axes of said wheels, one of said frame and housing units being pivotal on said shaft to permit it to tilt relative to the other unit, and disengageable means locking said rear plate and housing to prevent relative movement of the relatively tiltable units.

2. The combination defined in claim 1 in which openings are provided in said plate and the transverse wall of the housing which are in alignment when the front and rear wheel assemblies are properly longitudinally aligned, and said disengageable means comprises a latch pin received in said openings.

References Cited in the file of this patent

UNITED STATES PATENTS

| | | |
|---|---|---|
| 2,027,254 | Vogt | Jan. 7, 1936 |
| 2,173,068 | Schroeder | Sept. 12, 1939 |
| 2,714,017 | Mendez | July 26, 1955 |
| 2,722,428 | Longbotham | Nov. 1, 1955 |

FOREIGN PATENTS

| | | |
|---|---|---|
| 929,051 | Germany | June 16, 1955 |
| 262,242 | Great Britain | Dec. 9, 1926 |
| 113,808 | Sweden | Apr. 10, 1945 |